Figure 16:
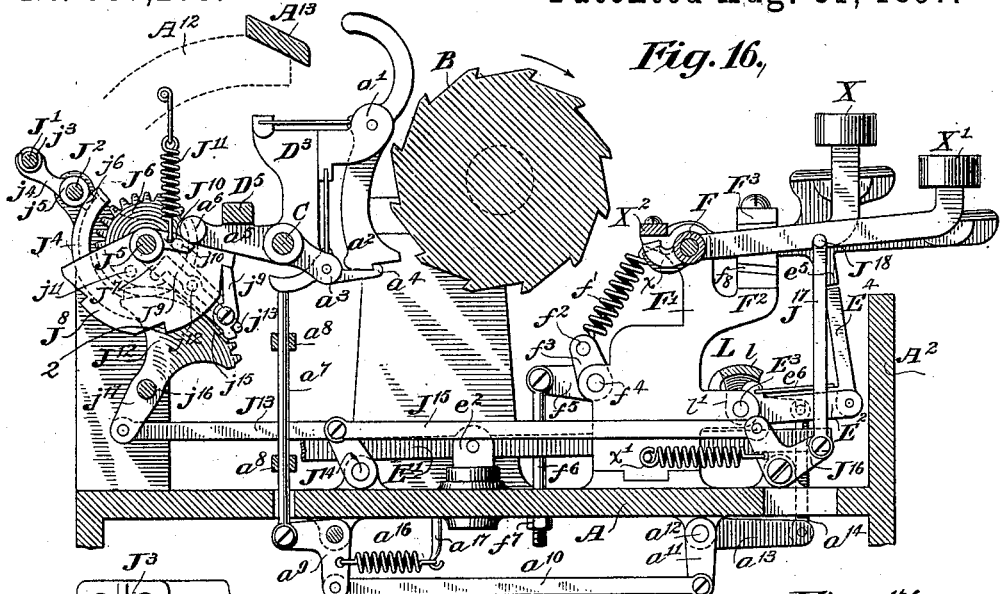

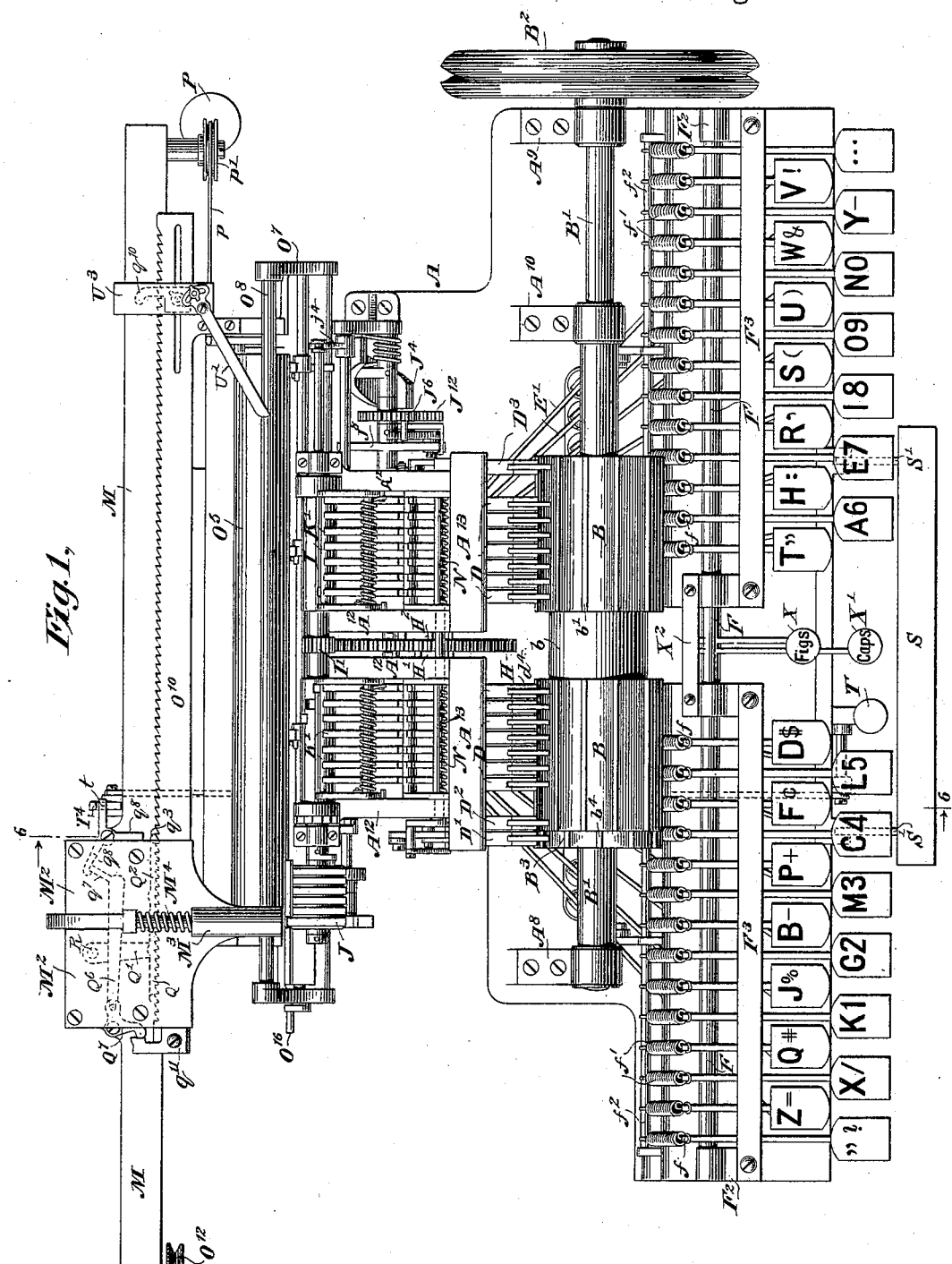

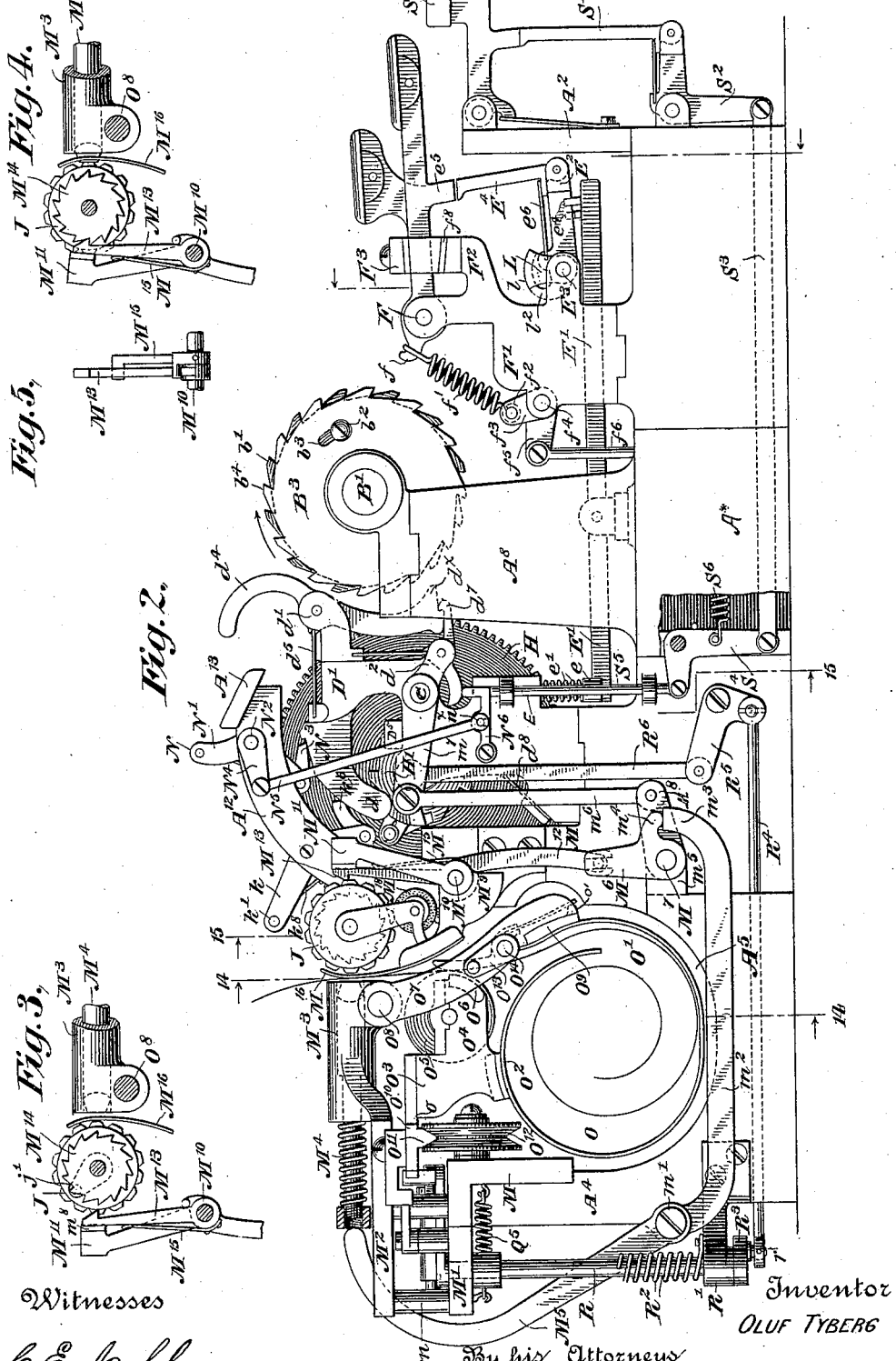

(No Model.) 10 Sheets—Sheet 3.
O. TYBERG.
TYPE WRITING MACHINE.
No. 589,233. Patented Aug. 31, 1897.
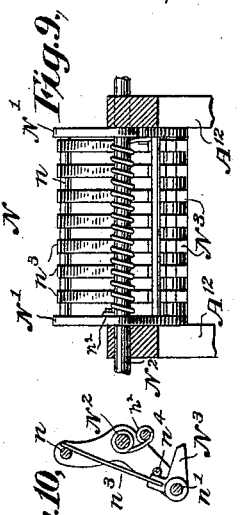
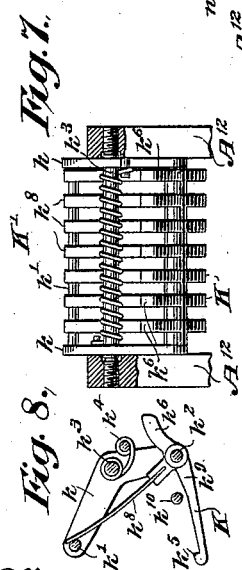
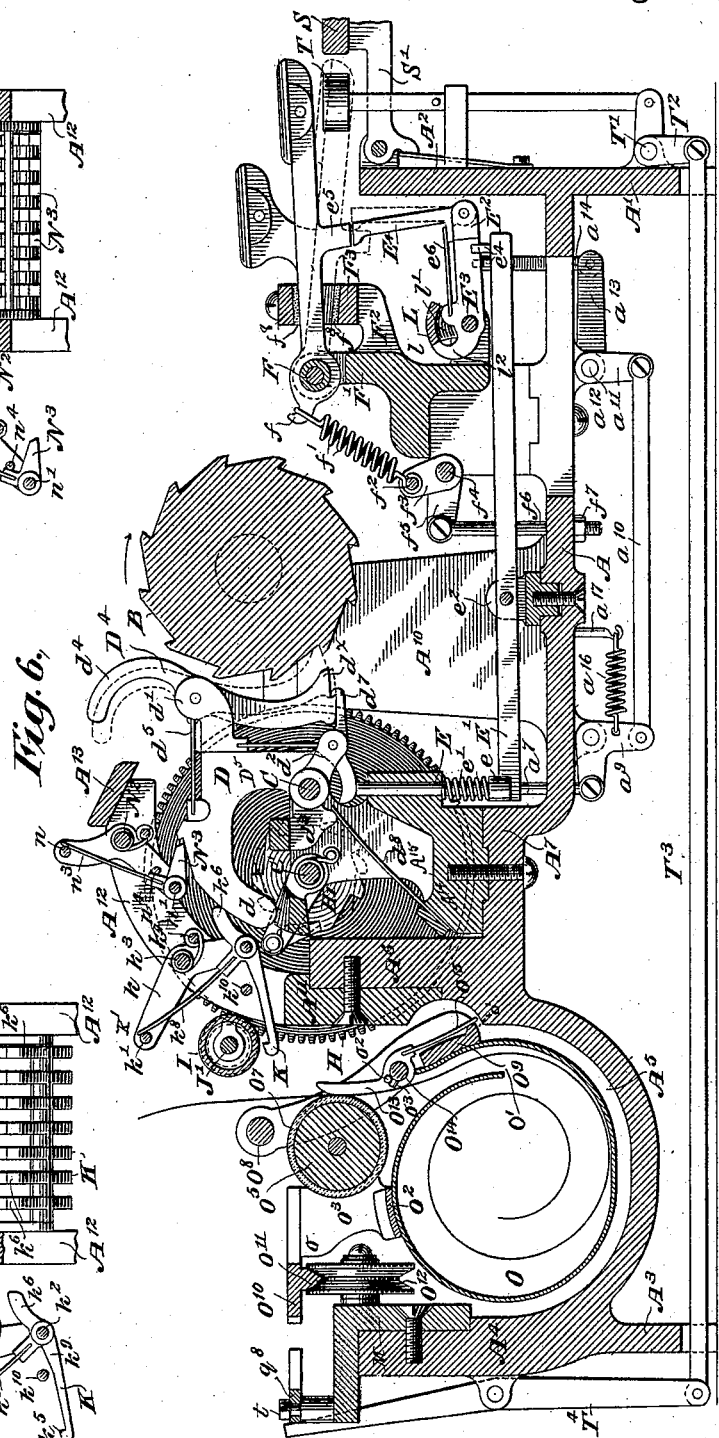
Witnesses
C. E. Ashley
Henry W. Lloyd
Inventor
OLUF TYBERG
By his Attorneys
Baldwin Davidson & Wight

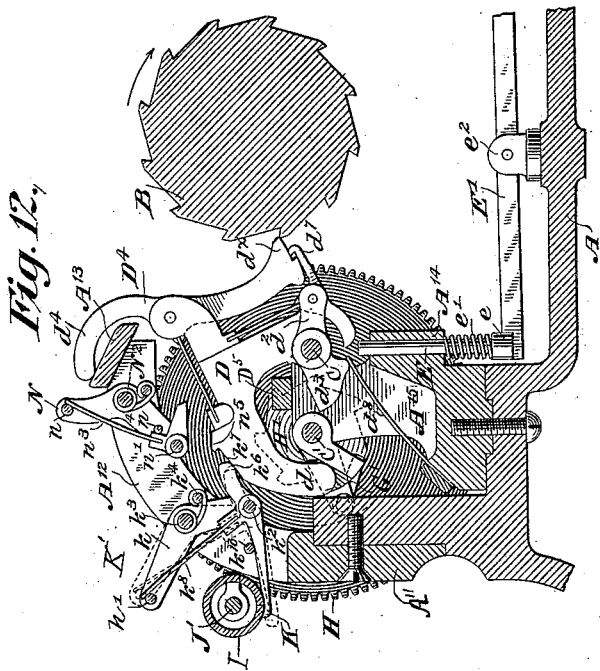

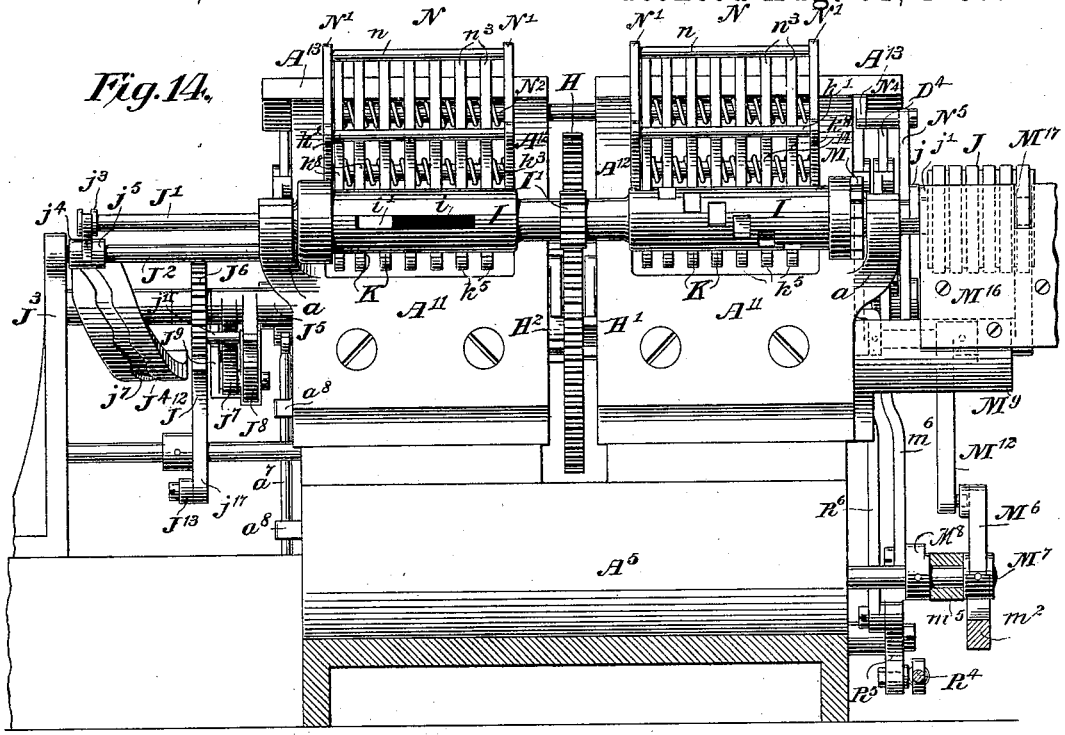

(No Model.) 10 Sheets—Sheet 6.

O. TYBERG.
TYPE WRITING MACHINE.

No. 589,233. Patented Aug. 31, 1897.

Witnesses
C. E. Ashley
Henry W. Lloyd

Inventor
Oluf Tyberg
By his Attorneys
Baldwin Davidson & Wight

THE NORRIS PETERS CO., PHOTO-LITHO., WASHINGTON, D. C.

(No Model.) 10 Sheets—Sheet 7.

O. TYBERG.
TYPE WRITING MACHINE.

No. 589,233. Patented Aug. 31, 1897.

Witnesses
C. E. Ashley
Henry W. Lloyd

Inventor
OLUF TYBERG
By his Attorneys
Baldwin Davidson & Wight

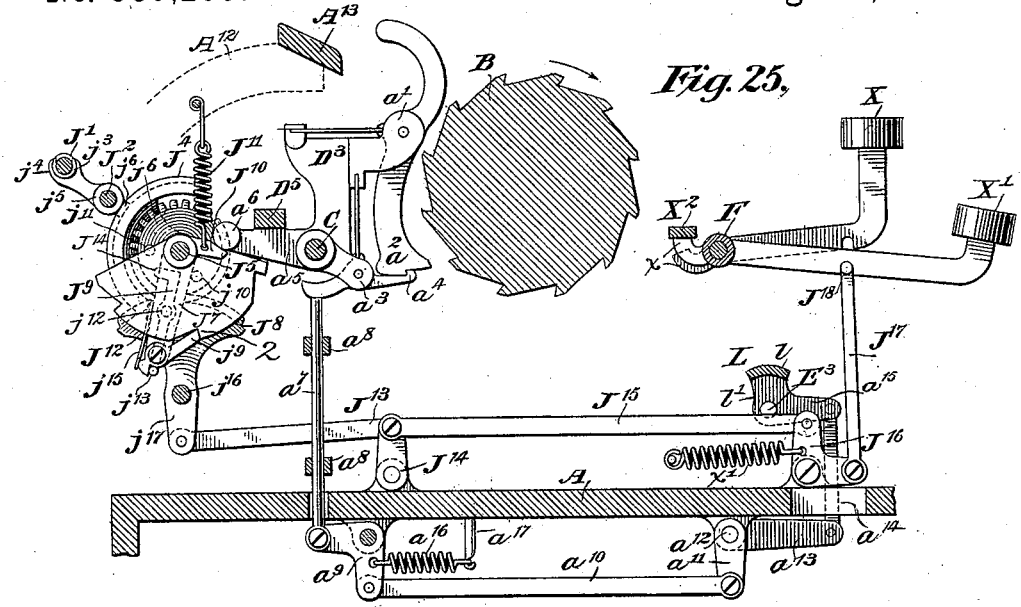

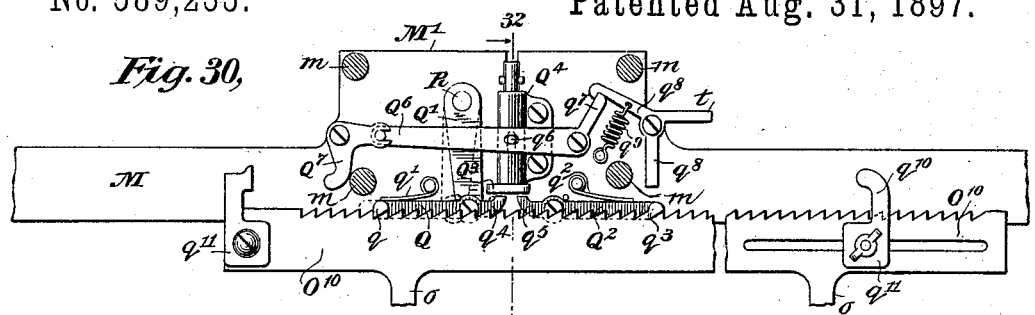
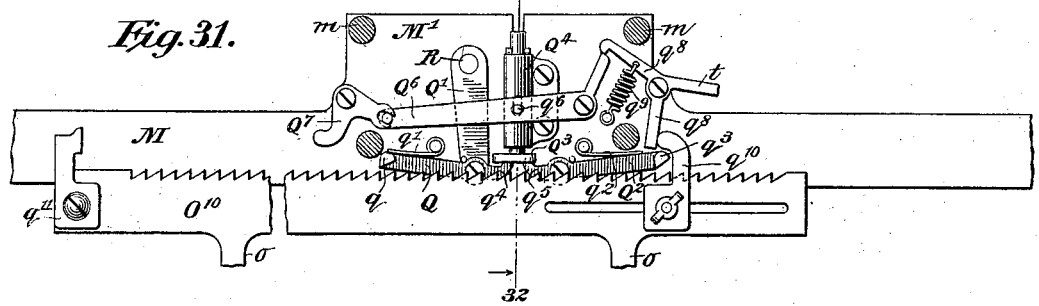
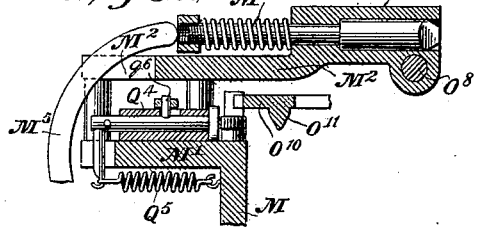
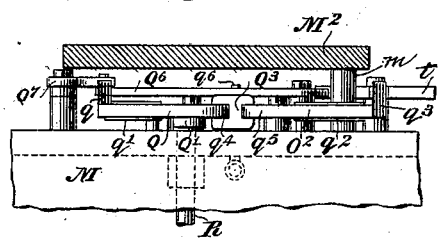
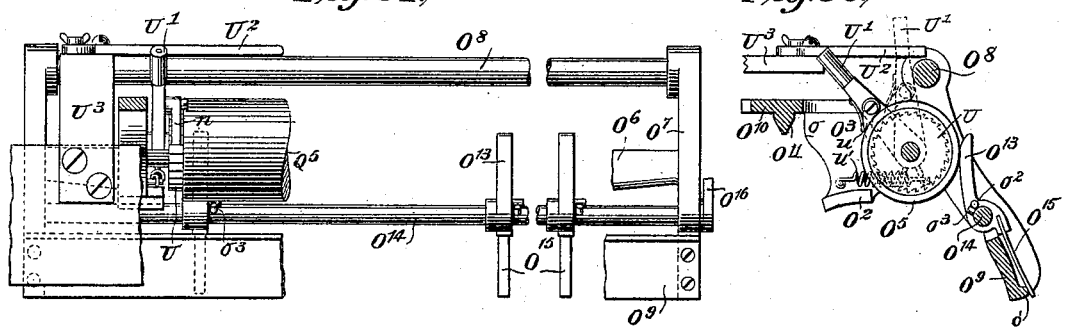

UNITED STATES PATENT OFFICE.

OLUF TYBERG, OF BROOKLYN, NEW YORK, ASSIGNOR TO THE TYBERG TYPEWRITER COMPANY, OF NEW YORK, N. Y.

TYPE-WRITING MACHINE.

SPECIFICATION forming part of Letters Patent No. 589,233, dated August 31, 1897.

Application filed March 17, 1891. Renewed June 3, 1896. Serial No. 594,175. (No model.)

*To all whom it may concern:*

Be it known that I, OLUF TYBERG, a subject of the King of Denmark, residing in Brooklyn, in the county of Kings and State of New York, have invented certain new and useful Improvements in Type-Writing Machines, of which the following is a specification.

The object of my invention is to operate a type-carrier which is normally stationary by a power-driven device or driver through mechanism normally out of operative connection with the driver, but connected therewith at the will of the operator to bring the desired character on the type-carrier into printing position and also to operate the paper-carriage and impression-hammer in a similar way. In general my object is to actuate, as far as possible, all the mechanism necessary to effect the printing of characters on a sheet of paper from a power-driven device or driver, the operating-keys being employed merely to cause different parts of the mechanism to be brought into operative connection with the driver.

In carrying out my invention I provide a type-carrier which is normally stationary, but is intermittently actuated and progressively rotated by a rotary device or driver through intermediate type-carrier-actuating mechanism adapted to operatively connect, at the will of the operator, the driver and the carrier. The finger-keys or levers are adapted to connect with different parts of the type-carrier-actuating mechanism, and the different keys acting on said mechanism determine the amount of movement to be given to the type-carrier from the driver. The type-carrier is provided with a series of circular rows of types, and mechanism is provided for shifting the carrier to bring any desired row into printing position in front of the hammer, which is also automatically operated from the driver when the keys are manipulated. The paper-carriage is fed forward step by step as the printing progresses by mechanism actuated by the driver, and when the carriage has reached the limit of its forward movement it is automatically returned to its initial position and the paper roller or platen is shifted to commence a new line. The carriage may be returned to the starting-point before it has reached the end of a line, if desired, by depressing one of the keys in the keyboard. In connection with the type-carrier-operating mechanism I employ devices for stopping the rotary type-carrier at any desired point and devices for locking it while the impression from the type is being taken.

My machine also embodies many other novel organizations of instrumentalities and details of construction, which will be hereinafter fully set forth, to provide for its accurate, easy, and convenient operation.

Figure 17:
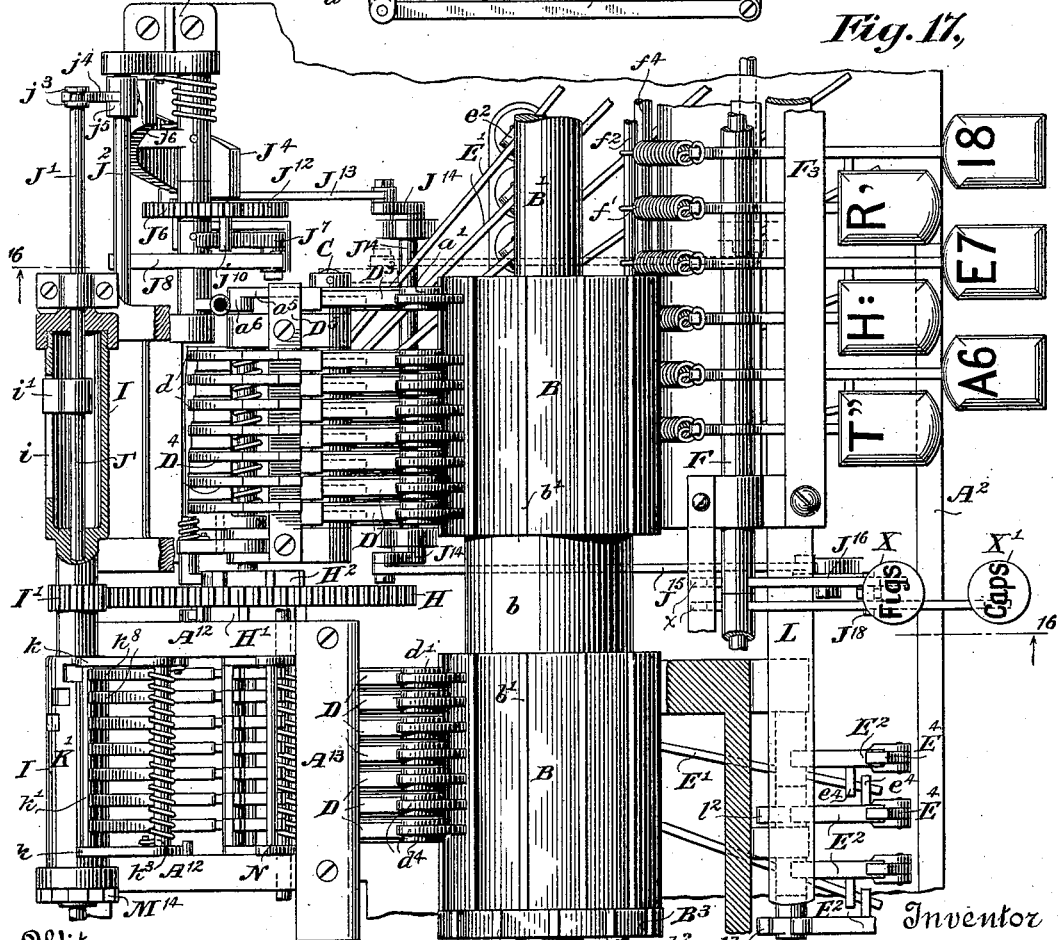
Figure 18:
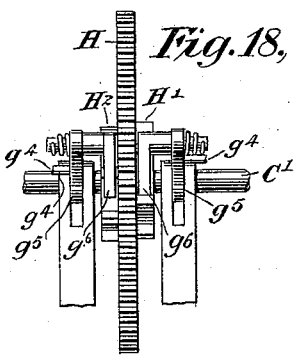
Figure 19:
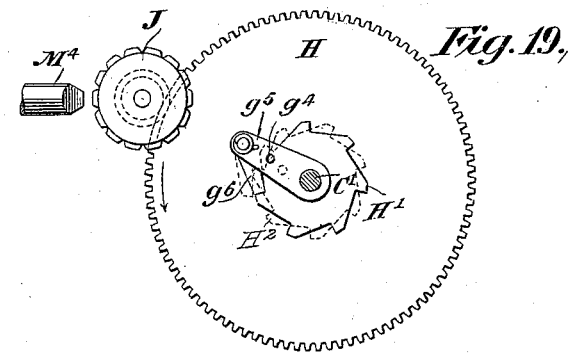
Figure 20:
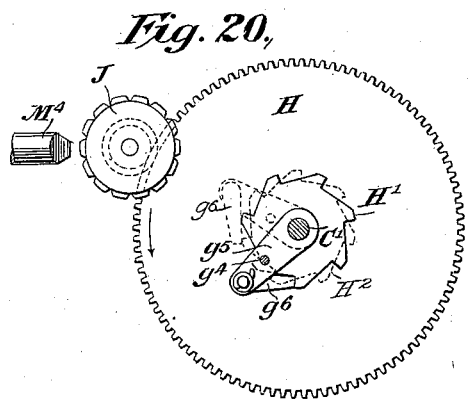
Figure 21:
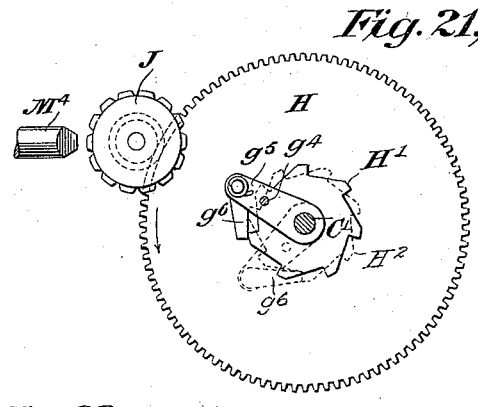
Figure 22:
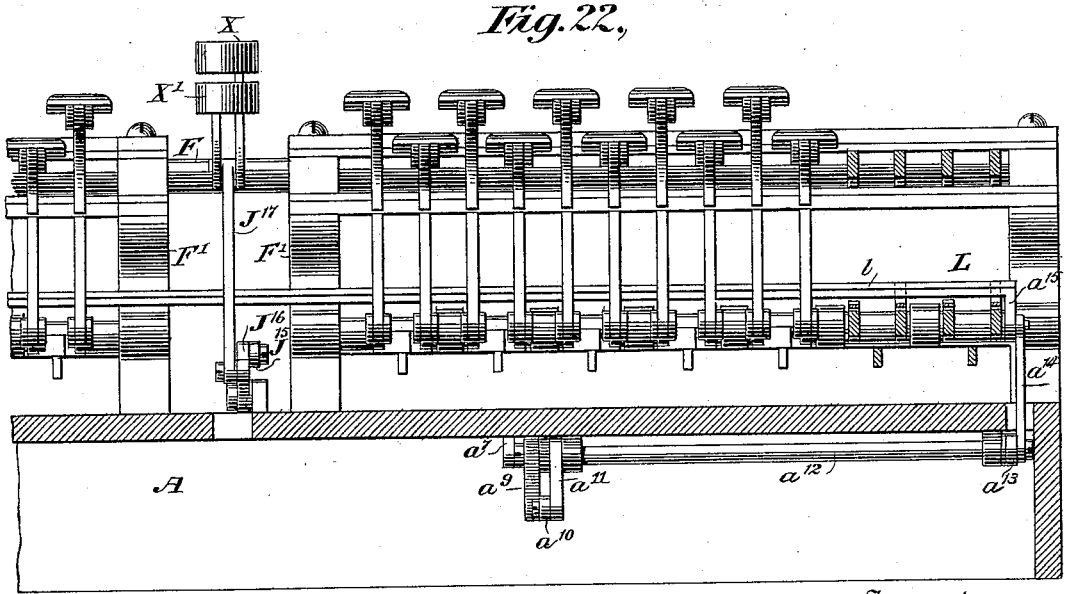
Figure 23:
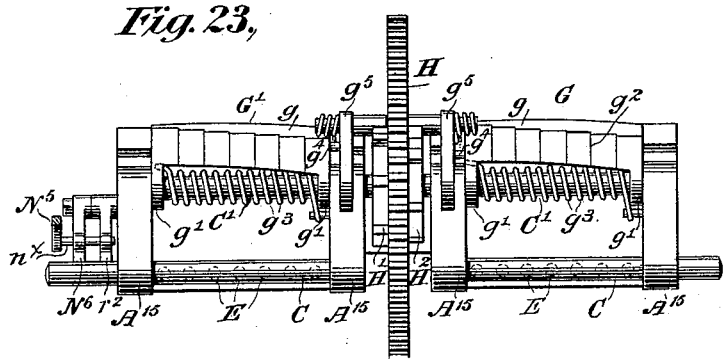
Figure 24:
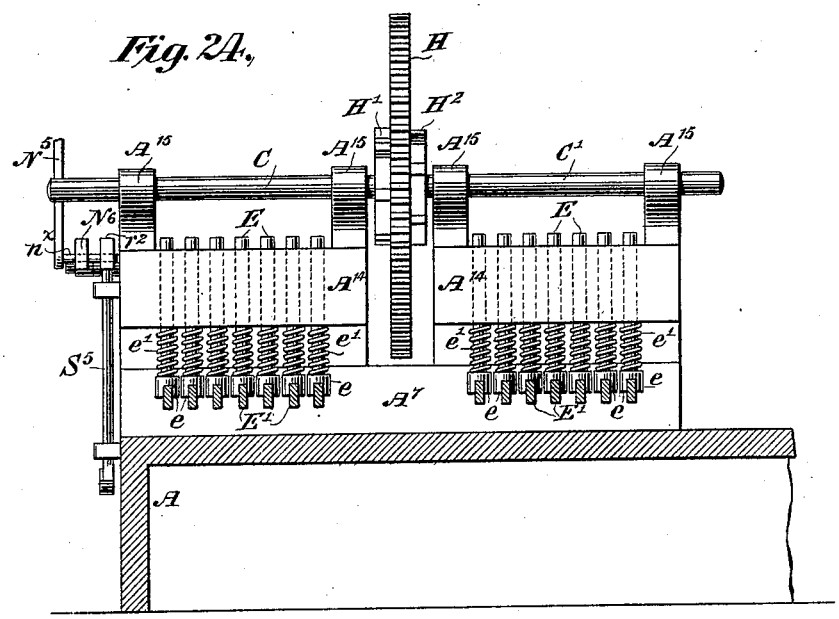

In the accompanying drawings, illustrating my invention, Figure 1 is a plan view of the machine; Fig. 2, a side elevation; Figs. 3, 4, and 5, detail views illustrating particularly the locking mechanism of the type-carrier. Fig. 6 is a longitudinal section on the line 6 6 of Fig. 1. Figs. 7 and 8 are detailed views of one of the stop-pawl-carrying frames for arresting the rotary type-carrier. Figs. 9 and 10 are detail views of one of the oscillating pawl-carrying frames which is connected with devices for releasing the hammer and carriage actuating mechanism. Fig. 11 is a detail view in section showing particularly the operative connections between the driver, the type-carrier-rotating devices, and the stop mechanism. Fig. 12 is a similar view showing some of the parts in a different position. Fig. 13 is a detail view of the type-carrier, the stop-cylinder, and certain mechanism immediately connected therewith. Fig. 14 is a transverse section of the machine on the line 14 14 of Fig. 2, looking in the direction indicated by the arrow. Fig. 15 is a similar view on the line 15 15 of Fig. 2. Fig. 16 is a longitudinal section through part of the machine, showing particularly the mechanism for shifting the type-carrier longitudinally. Fig. 17 is a view, partly in plan and partly in section, illustrating more clearly the details of some of the mechanism. Figs. 18, 19, 20, and 21 are detail views of the type-carrier-actuating gear-wheel and its actuating mechanism. Fig. 22 is a detail view, in transverse section, of a portion of the keyboard. Fig. 23 is a detail view showing in plan the rocking type-carrier-actuating frames and their connection with the type-carrier-actuating gear. Fig. 24 is a detail view showing particularly the dog-carrier-supporting frames and the pawl-tripping rods supported therein. Fig. 25 is a diagram showing a part of the mechanism for moving the type-carrier longitudinally. Fig. 26 is a similar view showing the several parts in a different position. Fig. 27 is a view of a cam, forming part of this mechanism, developed. Fig. 28 is a diagram view similar to Figs. 25 and 26, but showing some parts of the mechanism in a different position. Fig. 29 shows a further detail of this mechanism. Figs. 30 and 31 are plan views showing details of the paper-carriage-operating mechanism, the several parts of the organization being shown in different positions in the two figures. Fig. 32 is a section on the line 32 32 of Figs. 30 and 31. Fig. 33 is a detail view of this mechanism viewed from the front. Fig. 34 is a detail plan view of the paper-carriage and line feeding mechanism. Fig. 35 shows a cross-section of the same.

The frame of the machine is preferably constructed as follows: The frame-bed piece A, preferably of cast metal, is formed at the front with a downwardly-projecting flange $A'$ to form a front support and an upwardly-projecting flange $A^2$ to form a guard or front casing for the keys. At the rear end the bed is provided with a flange $A^3$ to form a rear support and an upwardly-projecting flange $A^4$ to form the rear wall of the casing for the carriage and paper receptacle. Sides $A^*$ close in the space below the bed-plate between the flanges $A'$ and $A^3$. At $A^3$ the bed is hollowed out or depressed to provide additional space for the paper receptacle or holder. In front of this hollowed-out portion is formed an upwardly-projecting flange $A^6$, extending from an elevation $A^7$ of the main part of the bed.

The several parts above described may all be cast integrally. The flange $A^6$ is divided centrally to accommodate the driving gear wheel of the type-carrier.

As shown in Fig. 1, the frame-bed is suitably shaped to accommodate the different parts of the mechanism mounted upon it. Its width varies, being widest at the front or keyboard end and relatively narrow at the rear. Two supports or pillars $A^8$ $A^9$ are carried on the frame-bed at each side thereof and carrying bearings for the shaft $B'$ of the rotary toothed cylinder or driver B. A third support or standard $A^{10}$ rises from the bed-plate and forms an additional support for a bearing of the shaft $B'$. The supports $A^8$, $A^9$, and $A^{10}$ may be formed in one piece with the bed A. To one end of the shaft $B'$ is secured a pulley or wheel $B^2$, which may be connected with any suitable motor or driving device for imparting a rotary motion to the shaft and the driver. The rotary driver B is rigidly secured to the shaft $B'$ and is shown as consisting of a cylinder provided or formed with an annular recess $b$ midway between its ends, and at each side of the central recess it is formed with a series of longitudinal teeth, ribs, or cams $b'$. Near one end the shaft $B'$ carries a disk $B^3$, connected to the cylinder by means of an adjusting-screw $b^2$, extending through a slot $b^3$ in the disk. The disk is also provided with a circular series of teeth $b^4$, which are out of line with the teeth $b'$ in the cylinder. Instead of providing a separate disk to carry the teeth $b^4$ I may form these teeth directly on the cylinder.

The "driver" (which term includes the toothed cylinder and the toothed disk) is used for giving motion to mechanism for actuating the type-carrier, the hammer, and the carriage. Two plates $A^{11}$ are secured to the rear of the flange $A^6$, one on each side of its central opening, each carrying at opposite ends upwardly-extending forwardly-projecting arms $A^{12}$, forming overhanging brackets, to the extreme front ends of which are secured on each side of the machine an inclined guide-bar $A^{13}$, which are shown clearly in Fig. 1. The brackets $A^{12}$ also serve as supports for other mechanism hereinafter described. A dog-carrier-supporting frame is secured to the elevation $A^7$ of the bed on opposite sides of the machine, each consisting of a block $A^{14}$, having at opposite ends upwardly-projecting standards $A^{15}$, which support shafts C and $C'$.

The shaft C carries a series of dog-carriers D $D'$ $D^2$ $D^3$. I have shown in the drawings seventeen dog-carriers mounted on the shaft C, fourteen of these carriers, (marked D,) seven on each side of the machine, form part of the mechanism for rotating or advancing the type-carrier to bring any one of the fourteen characters in a circular row of type on its periphery into printing position. The carriers marked $D'$, $D^2$, and $D^3$, respectively, form part of the mechanism for actuating the hammer, the carriage, and the type-carrier shifting devices.

I would state that while I have shown fourteen dog-carriers D a greater or less number may be employed, it being essential only that there should be one such carrier for every character in the circular row of type on the type-carrier.

Each carrier D is mounted loosely on the shaft C and is formed with a rearward extension $d$, a forward extension $d'$, a downwardly-extending bracket $d^2$, and a rearward extension $d^3$. In the forward extension $d'$ of each carrier D is pivoted a dog $D^4$, having an upwardly-extending curved tailpiece $d^4$, adapted to engage the inclined guide-bar $A^{13}$. The lower end of the dog below its pivot is provided with a tooth $d^\times$, adapted to engage any one of the teeth in the rotary driver B. A spring $d^5$, secured to the carrier D and connected with the dog $D^4$, tends to throw the tooth $d^\times$ into the path of the driver. The dog is held withdrawn from the driver by a spring-pawl $d^7$, pivoted in the bracket $d^2$. The short rearward extension $d^3$ is held in its normal position against a bar $D^5$, mounted on the standards $A^{15}$ by a spring $d^8$.

The seven dog-carriers and the parts above described are of the same construction on each side of the machine, the two shafts C C' carry them all, and a bar D⁵ on each side is used to hold the carriers in their normal position and to limit their movement when they return to normal.

Beneath each pawl $d^7$ the block $A^{14}$ is perforated vertically to allow the free passage of a spring-actuated rod or plunger E. There are fourteen of these plungers, each adapted at its upper end to abut against the tail of one of the pawls $d^7$. At its lower end the plunger is enlarged and bifurcated, in which bifurcation is received the end of a horizontal lever E'. Between the enlarged lower end $e$ of the plunger and the block $A^{14}$ is interposed a spring $e'$, normally holding the plunger out of engagement with the pawl $d^7$, and thereby permitting the engagement of the pawl $d^7$ with the dog $D^4$. There are fourteen levers E', each pivoted to a bearing-block $e^2$ on the bed-plate of the machine, and these levers are inclined or flare toward the front, so that they may be connected with their respective key-levers without interference. Each one of the levers E' is acted upon by a pair of impulse-levers $E^2$. There is one impulse-lever $E^2$ for each of the twenty-eight keys on the keyboard. These levers are all pivoted at their rear ends on a cross-bar $E^3$, secured to brackets at opposite ends of the machine. Each of the levers $E^2$ is provided with a lateral extension $e^4$, extending across the top of the corresponding lever E', and each lever $E^2$ at its front end carries an upwardly-projecting pivoted dog $E^4$, the upper end of which is adapted to engage with a lug $e^5$, projecting from the under side of a corresponding key-lever. A spring $e^6$, secured to each lever $E^2$ and connected with each dog E', normally holds the dog in position to engage with the lug $e^5$.

The twenty-eight keys in the keyboard are arranged in pairs, so that each lever E' may be operated upon by two keys. Two rows of keys are employed, the front row being on a lower plan than the rear. They are all pivoted to a rod F, secured to uprights F, rising from the front end of the frame-bed. There are four of these uprights employed, one at each end of the frame and two near the middle, a short distance apart. Each key is provided with a rearwardly-extending hook $f$, to which is secured a spring $f'$. There will therefore be twenty-eight such springs, and these springs are all secured to two horizontal rods $f^2$, carried in the outer ends of arms $f^3$, extending radially from a horizontal rod $f^4$, mounted in suitable bearings. Radially-extending arms $f^5$, secured at their outer ends to the upright rods $f^6$, extend through the bed A, are screw-threaded at their lower ends, and carrying adjusting-nuts $f^7$. By this means the tension of the springs $f'$ and of the keys may be varied. The uprights F' are provided with forwardly-extending arms $F^2$, which carry horizontal guide-pieces $F^3$, provided with transverse openings, through which the key-levers extend. The openings flare forwardly, and their top and bottom walls are lined with some soft material, constituting cushions $f^8$, to deaden or prevent the noise which would otherwise occur when the levers impinge against the guide-pieces. Each of the key-levers is provided with a downwardly-projecting lug $e^5$, adapted to engage with a corresponding dog $E^4$ on an impulse or tripping lever $E^2$.

When a key is depressed, a dog $E^4$ is moved downwardly and rocks the impulse or tripping lever $E^2$ about its pivot. The lateral extension $e^4$ then bears against the lever E' at its front end, causing its rear end to rise, move the plunger E upwardly, and disengage the pawl $d^7$ from the dog $D^4$, allowing the dog to move into the path of the rotary driver B. The plunger and the lever E' are then quickly returned to their normal position by the spring $e'$, and if the finger of the operator has been removed from the key just depressed the parts will all assume their normal position. The parts will also assume their normal position if the key is held down, because the dog $E^4$ being pivoted to the end of the lever $E^2$ when the lever E' returns to its normal position the end of the dog slides along the front side of the lug $e^5$, as indicated by dotted lines in Fig. 6, so that there is no interference with the quick return of the plunger out of the way of the pawl $d^7$, which is thus always free to act quickly to catch and hold the dog $D^4$ when it has moved backwardly into position out of the path of the driver.

When a key is depressed and a pawl $d^7$ is released, the corresponding dog $D^4$ moves into the position shown by dotted lines in Fig. 6 in the path of the rotary driver and engages a tooth therein. This position is also shown in Fig. 11. When the driver has moved a short distance, the dog $D^4$, the dog-carrier D, and the parts connected therewith are moved to the position shown in Fig. 12, in which it will be seen the upper end or tail of the dog $D^4$ has moved into engagement with the guide-bar $A^{13}$ and its lower end has been moved backwardly into engagement with the catch-pawl $d^7$. When the driver has moved a short distance farther, the dog will be disengaged therefrom and the dog-carrier D and the parts carried thereby will be returned by the spring $d^8$ to their normal position, as shown by full lines in Fig. 6.

When the machine is in use, the driver B is rotated continuously, and by means of the finger-keys one after another of the dogs $D^4$ is caused to move into the path of the driver.

The rear ends $d$ of the dog-carriers are arranged to engage with two rocking frames G G', which I call the "type-carrier-actuating" frames, as they communicate motion from the dog-carriers to the type-carrier through intermediate connecting mechanism presently to be described. Each of these rocking frames consists of an inclined stepped bar $g$, secured at opposite ends to arms $g'$, loosely mounted on the shaft $C'$ between the uprights $A^{15}$. There are seven steps $g^2$ in each bar $g$, one for each character in one-half of a circular row on the type-carrier. Springs $g^3$, one on each side of the machine, encircle the shaft $C'$ and are secured to the frames G and $G'$ and to the uprights $A^{15}$ in such manner that both frames are normally held elevated to the full extent of their upward movement against the ends of two of the dog-carriers.

As clearly shown in Fig. 15, the ends $d$ of the dog-carriers, when in their normal position, are located at different distances from the inclined stepped bar $g$. As shown, the carrier at the extreme left is in contact with the bar $g$, and the other six in the set are at gradually-increasing distances therefrom. Now as the dog-carriers are all arranged to be moved through the same distance it is obvious that the frame G or $G'$ will be moved different distances by the dog-carriers. If, for instance, the dog-carrier at the extreme left be actuated, the frame G will be given its greatest movement, and if the carrier in this set next the center be actuated the frame will be given its least movement.

The shaft $C'$ extends from one side of the machine to the other, and between the two sets of dog-carriers carries a gear-wheel H, which I call the "type-carrier-actuating gear-wheel." Two ratchet-wheels $H'$ and $H^2$ are secured to opposite sides of the wheel H at its center. They are of the same size and have an equal number of teeth—viz., seven—but the teeth on one wheel are out of line with the teeth on the other. As shown, the teeth in the wheel $H'$ are arranged midway between those in the wheel $H^2$. Each type-carrier-actuating frame G or $G'$ is connected, by means of a pin $g^4$, with a pawl-carrying arm $g^5$, loose on the shaft $C'$. Each of these arms carries a spring-pawl $g^6$, engaging with the ratchet-wheels $H'$ and $H^2$. As the frames G and $G'$ are rocked the ratchets and the gear-wheel are moved progressively about their common axis. A pawl and ratchet on one side of the wheel H is used to impart motion to the type-carrier to bring the characters in one-half of a circular row thereon into position, and the ratchet and pawl on the opposite side of the gear-wheel are employed for a similar purpose for the remaining characters in the row.

The gear-wheel H meshes with a pinion $I'$, secured to or formed on the reduced central portion of a stop-cylinder I, connected to and rotating with the type-carrier shaft $J'$. The teeth in the wheel H are exact multiples of the teeth in the pinion $I'$, shown as one to seven. This multiple corresponds to the number of teeth in the ratchet-wheel.

The pawls $g^6$, which operate the type-wheel through the ratchet-wheels $H'$ $H^2$, gear H, and pinion $I'$, are always held by springs in a certain normal position, from which they are moved positively in one direction, but with different amounts of oscillation, corresponding to the various distances between the letters on the type-carrier. Whenever a pawl returns to its normal position after having moved the ratchet-wheel ahead, it will enter a new tooth. As the number of teeth in the gear-wheel is equal to a multiple of the teeth in the ratchet and pinion it follows that the relation of the pawl and its motion to the type-carrier and its letters is the same in any one of the teeth of the ratchet, and in case the second oscillation of the pawl should be the same as the first one the type-carrier would make exactly one complete revolution, and thus bring the same character into printing position.

The stop-cylinder on opposite sides of its reduced central portion is hollow and formed with two longitudinal slots $i$, one on each side of the pinion $I'$, through which extend two arms $i'$, rigidly secured to the shaft $J'$. By this construction while the shaft always revolves with the cylinder it is free to move longitudinally relatively thereto.

The shaft $J'$ is mounted in bearing-brackets $a$, projecting rearwardly from the plates $A^{11}$, and carries at one end a type-carrier J, in this instance shown as of cylindrical form. It may be made of rubber, metal, or other material or combinations of materials, and carries on its periphery six circular rows of type. A greater or less number of rows may, however, be used.

To secure the carrier J to its shaft, I preferably employ an arm $j$, secured to the shaft and provided with a pin $j'$, which enters a hole in the inner end of the carrier. A collar or nut $j^2$ on the end of the shaft holds the type-carrier in engagement with the arm $j'$. By this construction the carrier may be readily removed from its shaft and a new carrier, or one having different types or a different arrangement of types, substituted.

The stop-cylinder I is formed on each side of the pinion $I'$ with seven notches or grooves $i^2$, one for each character in a circular row of type on the type-carrier. These notches or grooves on each side are arranged in spiral form half-way around the cylinder and are adapted to receive the ends of a corresponding number of stop-pawls K. There are two sets of stop-pawls, seven in each set, mounted in yielding frames $K'$, supported by the overhanging brackets or arms $A^{12}$. As shown in Figs. 7 and 8, each of these stop-pawl-carrying frames consists of two bent arms $k$, connected at their upper ends by a rod $k'$, at their lower ends by a rod $k^2$, on which the stop-pawls K are loosely mounted. Springs $k^3$, secured to the pawls, bear against the rod $k'$ and tend to move the pawls into engagement with the stop-cylinder. A rod $k^3$ connects the arms at their elbows and is supported in cone-bearings by the brackets $A^{12}$. A spring $k^4$, encircling the rod $k^3$ and secured at one end to the frame and at the other end to one of the brackets $A^{12}$, holds the pawl-carrying frame in proper position to permit the usual action of the pawls, but allows the frame to yield should two or more of the pawls be actuated simultaneously. Each pawl has a tooth $k^5$, adapted to engage with a corresponding notch in the stop-cylinder, and each has a tailpiece $k^6$, bearing against the rear end $d$ of a corresponding dog-carrier D. When the dog-carrier is in its normal position, as shown in Fig. 6, the stop-pawl is out of engagement with the stop-cylinder, but when the dog-carrier is moved backwardly, as shown in Fig. 12, the tail of the pawl enters a recess $k^7$ in the dog. It is then released and by means of its spring $k^8$ is moved about its pivot, causing its toothed end to enter a notch or groove in the stop-cylinder.

So long as the dog-carriers are moved independently or successively there will be no interference in the action of the several stop-pawls, but should two dog-carriers be moved back at precisely the same time the stop mechanism would not operate correctly, unless some provision were made to prevent interference. It will be observed that each stop-pawl is formed with an inclined upper edge $k^9$, over which is arranged a rod $k^{10}$, secured to the brackets $A^{12}$. When one of the pawls is made to engage with the stop-cylinder, as shown in Fig. 12, it rests against this rod in the position there shown in full lines; but should two dog-carriers be actuated simultaneously to act upon two stop-pawls successively the stop-pawl which first engages with the stop-cylinder is pulled backwardly thereby. In this backward movement the upper inclined edge of the pawl comes in contact with the cross-rod $k^{10}$ and the rear toothed end of the pawl is moved away from the cylinder. The other stop-pawl may then engage with the stop-cylinder. The pawls will operate in a similar way should three or more keys be depressed at the same time.

I have now described mechanism which will enable the operator to bring any character in the first circular row of type into printing position. I will next describe the mechanism by which the six rows of type on the carrier may be shifted longitudinally relatively to its axis, so that any character on any one of the six rows may be brought into printing position. I have devised different ways of accomplishing this result. The drawings show the way now best known to me, but I do not wish to be limited to the specific organization illustrated, nor to the details of construction.

The type-carrier is connected with a shifter, and the shifter is in operative connection with an arm engaging a plate. The position of the arm relatively to the plate may be changed, and when the arm is moved to produce this change the shifter is also moved, thereby moving the type-carrier longitudinally. The plate is operatively connected with means for moving it to correspondingly move the arm.

The type-carrier shifter is in the drawings shown as a cam. The arm carries a pawl engaging notches in the plate. Keys are employed for operating mechanism for moving the arm to in turn move the shifter, and other devices are used to move the notched plate.

There are a series of rows of type on the type-carrier, and the distance between any two adjacent notches in the plate corresponds to twice the distance between two adjacent rows of type on the carrier, but when the arm which engages the plate moves from one notch to the next the type-carrier is moved longitudinally the distance between two rows.

The specific arrangement shown in the drawings is as follows: The type-carrier shaft J' is extended at one end and provided with a collar $j^3$, having an annular recess from which extends an arm $j^4$, carried by a sleeve $j^5$, free to slide on a rod $J^2$, secured to a bracket $a$ and to an upright $J^3$ at one side thereof. The sleeve $j^5$ is provided with a lateral extension carrying a roller $j^6$, which enters a groove in a cam $J^4$, secured to a shaft $J^5$, mounted in the bracket $A^{12}$ and upright $J^3$. This cam, which is the type-carrier shifter, extends in a curved line part way around the shaft $J^5$ and is inclined relatively to its axis. It is provided on its outside with a groove $j^7$, divided into a series of five parts, as shown in Fig. 27, by four shoulders $j^8$, two on each side. These shoulders, with the end walls of the slot, form stops for holding the roller on the sleeve $j^5$ when moved the desired amount. A gear-wheel $J^6$ is loosely mounted on the shaft $J^5$, between the cam and the bracket $A^{12}$. A laterally-projecting arm $J^7$, rigidly secured to the shaft, is provided on its outer end with a spring-pawl $j^9$, adapted to engage with notches in the edge of a segmental plate $J^8$, loose on the shaft $J^5$. Pins $j^{10} j^{11}$ project laterally from the wheel $J^6$ on opposite sides of the arm $J^7$, and when the pinion or wheel is rotated the pins engaging with the arm will move it about its axis. The arm $J^7$ carries a lever $J^9$, pivoted at $j^{12}$ and at its lower end provided with a pin $j^{13}$, engaging with the tail of the pawl $j^9$. The upper end of the lever $J^9$ has a laterally-projecting arm $j^{14}$, which normally extends beyond the side of the arm $J^7$. A spring $j^{15}$ normally holds the pawl $j^9$ in position to engage with notches in the segmental plate $J^8$. The hub of the segmental plate is provided with a projecting arm $J^{10}$, and to this arm is secured a spring $J^{11}$, attached to one of the supporting-arms $A^{12}$. The wheel $J^6$ meshes with the teeth in a segmental lever $J^{12}$, pivoted to a stationary part of the frame at $j^{16}$. The lever is provided with a downwardly-projecting arm $j^{17}$, which is pivotally connected to a rod $J^{13}$, in turn connected to a shaft $J^{14}$, mounted in bearings on the frame A. This shaft is in turn connected by a rod $J^{15}$ with a bell-crank lever $J^{16}$, pivoted on a bracket on the main frame. The lower front end of the bell-crank lever is connected with an upright rod $J^{17}$, having laterally-projecting arms $J^{18}$, with which the shifting keys X and X' are adapted to engage. By depressing either one of these keys the segmental lever $J^{12}$ may be moved about its pivot by the means of the connections above described.

The shifting levers are pivoted at their inner ends to the rod F, and each of the levers is provided with an upwardly-extending rear end $x$, adapted to abut against a horizontal cross-piece $X^2$. The ends $x$ on the shifting levers are of different lengths, so that one of the levers may be moved farther than the other. In the drawings the arrangement is such that the rear shifting lever X moves farther than the other one, and will thus give to the bell-crank lever $J^{16}$, and through its connections, a greater movement to the segmental lever $J^{12}$ than the other shifting key or lever.

The dog-carrier $D^3$, which, as before stated, forms part of the mechanism for effecting the longitudinal movement of the type-carrier, is located at the right-hand side of the machine on the shaft C. This lever is formed with a forwardly-projecting arm $a'$, in which the dog $a^2$ is pivoted, a downwardly-inclined bracket $a^3$ at the lower end, in which the spring pawl or catch $a^4$ is pivoted, and a rearward extension $a^5$, which has a laterally-projecting arm or stud $a^6$, adapted to engage with the arm $J^{10}$ of the segmental plate $J^8$. The dog $a^2$ and the pawl $a^4$ are connected with the carrier $D^3$ and are provided with springs and are arranged to operate in a similar manner to that described in connection with the mechanism for giving to the type-carrier a motion about its axis. In other words, the parts are similar in all respects, except that the rearward extension at the top of the dog-carrier is omitted and the lower extension is prolonged and provided with the arm $a^6$. The cross-bar $D^5$ limits the upward movement of the arm $a^6$. A rod $a^7$ extends vertically through the frame A and through guide-brackets $a^8$. It is adapted when raised to disengage the pawl $a^4$ from the dog $a^2$. The lower end of the rod $a^7$ is connected with a bell-crank lever $a^9$, in turn connected by a link $a^{10}$ with an arm $a^{11}$ on a shaft $a^{12}$. Another arm $a^{13}$ on the shaft $a^{12}$ is connected by a link $a^{14}$ with an arm $a^{15}$, forming part of an oscillating frame L, consisting of a curved top piece $l$ and arms $l'$, radiating from the rod $E^3$. The top piece $l$ extends all the way across the keyboard, and the arms $l'$ are at each end thereof. The oscillating frame and the parts connected therewith are held in their normal position by a spring $a^{16}$, secured to the bell-crank lever $a^9$ and to a pin $a^{17}$, projecting from the frame A.

When the oscillating frame L is swung forwardly, so as to force the rod $a^7$ upwardly to release the pawl or catch $a^4$, the dog-carrier $D^3$ is moved about the shaft C by the driver, and the arm $a^6$ coming in contact with the arm $J^{10}$ moves the segmental plate $J^8$, and consequently the arm $J^7$ and the cam, both of which latter are secured to the shaft $J^5$, a sufficient distance to cause the sleeve $j^5$, and consequently the type-carrier shaft $J'$, to move longitudinally one space, sufficient to bring the second row of type on the carrier into printing position. This movement of the frame L is caused by the impulse-levers connected with the front row of key-levers, each of which is provided with an upwardly-curved rearward extension $l^2$, adapted to engage with the top piece $l$. When one of the keys in the front row is depressed, the frame L is swung around its axis and, through the mechanism above described, releases the pawl $a^4$ and allows the dog-carrier $D'$ to be operated to turn the segmental plate $J^8$ and the cam a sufficient distance to move the type-carrier to bring the second row of type into position. The keys in the front row give not only this longitudinal movement to the type-carrier, but also give to it a movement about its axis to bring the desired character in the second row of type into printing position through the levers $E'$ in the manner hereinbefore described.

To bring the third row of characters into printing position, the shifting lever $X'$ is depressed. This moves the segmental lever $J^{12}$ about its pivot, turns the gear-wheel $J^6$, which by means of the pin $j^{11}$ causes the arm $J^7$ to move and bring the pawl $j^9$ into the central notch 2. This movement of the arm $J^7$ moves the cam a sufficient distance to bring the third row of type on the type-carrier into printing position, and it will remain in this position as long as the key $X'$ is depressed. As soon as the key $X'$ is released it is returned to its normal position by means of a spring $x'$, attached to the bell-crank lever $J^{16}$ and to some part of the frame of the machine. The segmental lever $J^{12}$ and the gear-wheel $J^6$ are also returned. In returning the pin $j^{10}$ first strikes the projection $j^{14}$ on the lever $J^9$, turns it about its pivot, and causes the disengagement of the pawl $j^9$ from the segmental plate $J^8$. The segmental plate, arm, and cam through the force of the spring $J^{11}$ then return to their normal position, and the type-carrier is also returned.

If while the pawl $j^9$ is in the notch 2 and the key $X'$ is depressed one of the keys in the front row is actuated, the dog-carrier $D^3$ is moved in the manner above explained, so as to turn the plate $J^8$, the arm $J^7$, and the cam $J^4$ to bring the fourth row of type into printing position, and at the same time the desired character in this row is brought to the printing-point.

To bring the fifth row into position, the lever X is depressed, which through the intermediate mechanism above mentioned moves the type-carrier shaft the desired amount, and any character may be printed from the fifth row by the rear row of keys on the keyboard.

If while the lever X is depressed the front row of keys is operated upon, the printing is effected from the sixth row of the type-carrier. By similar mechanism more than six rows of type may be operated.

To press the paper against the type-carrier, I employ a hammer, which is mounted, constructed, and operated as follows: An angle-iron M is secured to the flange $A^4$ of the frame and is formed with a rearward extension M'. A plate $M^2$ is mounted on four short uprights $m$, secured to the angle-iron and its extension, and at its front end is formed with a cylindrical guide-bracket $M^3$, in which a spring-plunger $M^4$, forming part of the hammer mechanism, is free to slide. Normally the plunger is held away from the type-carrier by its spring. A curved arm $M^5$ bears against an adjustable nut on the plunger $M^4$ and is pivoted at $m'$ to the side of the frame of the machine. An extension $m^2$ of the arm $M^5$ projects forwardly and has an upwardly-curved end $m^3$, with which engages a finger $m^4$ on a rocking arm $M^6$, secured to a shaft $M^7$. The shaft $M^7$ is mounted in a bracket $m^5$ and has secured to it an arm $M^8$, connected by means of a link $m^6$ to the projecting end $m^7$ of a dog-carrier D'. The dog-carrier D' is similar to the carriers D and $D^3$, before described, and is operated in a similar way. It is not, however, provided with an extension $d$, like the dog-carriers D, nor an arm $a^6$, like the carriers $D^3$. When the dog-carrier D' is operated by the rotary driver, motion is imparted to the curved arm $M^5$, which reciprocates the plunger $M^4$, causing it alternately to press the paper against the type-carrier. In connection with the hammer-operating mechanism I employ devices for checking the rebound of the type-carrier and for securely locking it while the impression is being taken, and also a brace to hold the carrier against the force of the hammer.

A bracket $M^9$ is secured to the side of the frame, and in this bracket is mounted a shaft $M^{10}$, to which is secured an arm $M^{11}$, carrying at its upper end a cushion $m^8$, adapted to bear against the type-carrier on that side opposite the hammer. A rod $M^{12}$ connects the shaft $M^{10}$ with the rocking arm $M^6$, preferably by means of a sliding or yielding connection, as shown, and when the arm $M^6$ is rocked the bracing-arm $M^{11}$ is moved toward and from the type-carrier. This movement corresponds with the movement of the hammer, so that when the hammer presses the paper against the carrier the bracing-arm $M^{11}$ presses against the opposite side of the carrier and sustains it against the force of the hammer.

On the shaft $M^{10}$ is mounted a pawl $M^{13}$, adapted to engage with a ratchet-wheel $M^{14}$ on the type-carrier shaft. This ratchet-wheel is provided with fourteen teeth, equal in number to the number of characters in a circular row on the type-carrier. The pawl $M^{13}$ is loosely mounted on the shaft $M^{10}$, but is connected to move therewith by a spring $M^{15}$. By this arrangement when the pawl is moved to engage with the ratchet $M^{14}$ it will yield to allow the ratchet to revolve in one direction—viz., that in which the carrier is moved by its actuating mechanism; but when the movement of the carrier has been completed and arrested by the stop mechanism the pawl $M^{13}$ engages a tooth on the ratchet and prevents it from moving backward or rebounding. The hammer, brace, and locking mechanism are so arranged and timed in connection with the type-carrier-actuating mechanism and its stopping mechanism that the type-carrier is moved the desired amount and stopped at the right time to present the desired character. Then the locking-pawl engages the ratchet on the type-carrier shaft to hold it firmly, and then the hammer and bracing-arm are applied to the carrier.

In order that the operation may be as above stated, the dog-carrier D' is made to engage with teeth $b^4$ on the rotary driver, which are out of line with the teeth $b'$, so that the actuating mechanism of the type-carrier is first operated by a tooth $b'$ and then the actuating mechanism of the hammer and its connected parts are operated immediately afterward by a tooth $b^4$ on the driver. The hammer mechanism and the mechanism described in connection therewith are brought into operation each time that a character is brought to the printing-point by the devices now to be described.

Above the series of dog-carriers D, which form part of the type-carrier-actuating mechanism, on each side of the machine is mounted a frame N, each consisting of two side pieces N', secured to a shaft $N^2$, mounted on the arms or brackets $A^{12}$. These side pieces are connected at the top by a rod $n$ and at their bottom by a rod $n'$. A spring $n^2$, encircling the shaft and secured to a bracket $A^{12}$ and to the frame N, holds it in its normal position. On each of the rods $n'$ are pivoted seven dogs $N^3$, the extensions or tails of which are provided with springs $n^3$, bearing against the rod $n$. The extensions of the pawls when in their normal position rest against a cross-rod $n^4$. Each pawl rests upon a cut-away portion $k^7$ on a dog-carrier D, and when the dog-carrier is moved backward about its pivot a tooth $n^5$ on the carrier comes in contact with a pawl $N^3$ and thereby causes the frame N to rock about its pivot. The shaft $N^2$ extends entirely across the machine, so that any one of the dog-carriers D in either set of type-carrier-actuating devices may turn it. The shaft $N^2$ is provided at one end with an arm $N^4$, which is connected by a link $N^5$ with a rod $n^\times$, engaging the pivoted dog $N^6$, adapted to press against the tail of the pawl carried by the dog-carrier D', and release it from the dog to allow it to engage the teeth $b^4$ in the rotary driver.

As there is one pawl $N^3$ for each of the dog-carriers D and as one of them must be operated every time that a dog-carrier D is operated, the dog-carrier D' will be brought into operation each time that the type-carrier is moved to bring a character to the printing-point.

Between the hammer and the type-carrier is interposed a shield $M^{16}$, secured to the bracket $M^9$, and having a slot or opening $M^{17}$ to expose a character upon the type-carrier to the paper pressed forward by the hammer. Ink may be applied to the type-carrier by a roller $M^{18}$, mounted in suitable bearings beneath the carrier.

The paper upon which the printing is done is contained within a casing O, which may be made of sheet metal, rubber, or other suitable material, and curved so as to fit within the hollowed-out portion of the frame. At the front the casing or holder O is provided with an opening O', through which the paper may be fed upwardly. A bar $O^2$ is secured to the top of the casing O, and at each end is provided with an upwardly-extending side piece $O^3$, which is formed with a forwardly-extending arm $O^4$. The arms $O^4$ are provided with bearings for the shaft of the roller $O^5$ and with extensions $O^6$, which are connected to or formed with inclined side pieces $O^7$, secured at their upper ends to a horizontal rod $O^8$, which extends loosely through a perforation in the casing $M^3$ of the plunger $M^4$. At their lower ends the side pieces $O^7$ are connected by a bar $O^9$. The sides $O^3$ are formed with rearwardly-extending arms $o$, connected with a rack-bar $O^{10}$, which has a series of ratchet-teeth on its rear edge. The rack-bar has a downwardly-projecting V-shaped rib $O^{11}$, which rests on correspondingly-shaped rollers $O^{12}$, secured to the angle-piece M.

To hold the paper in position against the roller, I provide a series of pivoted fingers $O^{13}$, mounted loosely on a rod $O^{14}$, extending from one side piece $O^7$ to the other. Each of the fingers $O^{13}$ is provided with a spring $O^{15}$, which bears against a rib $o'$ on the bar $O^9$. The fingers are so mounted that they may bear independently against the paper to press it against the roller, and each is adapted to yield or move backwardly independently; but in order that they may be withdrawn from the paper and roller simultaneously I provide the rod $O^{14}$ with a crank or handle $O^{16}$, and each finger is provided with a laterally-projecting pin $o^2$, which engages a pin $o^3$ on the rod $O^{14}$. By turning the crank the rod $O^{14}$ may be turned to cause the pins $o^3$ to engage with the pins $o^2$ and lift all the fingers away from the paper and roller simultaneously. Any desired number of fingers may be employed, and they are located at suitable distances apart across the face of the roller.

The parts above described constitute the paper-carriage, and they are adapted to move transversely back and forth across the machine. The carriage is normally held at its starting-point at the right-hand side of the machine by a weight P, attached to a cord $p$, passing over a pulley $p'$ and connected with the carriage-frame. A spring or other similar equivalent device may be used instead of the weight. The carriage is fed forward step by step by a pawl Q, having an upwardly-projecting tooth $q$ at one end. A spring $q'$ tends to move the pawl into engagement with the rack-bar $O^{10}$. The pawl Q is pivoted to the end of a horizontal arm Q', secured to a shaft R, extending vertically through the extension M' of the angle-piece M and is oscillated by a mechanism hereinafter described.

A stop-pawl $Q^2$ is pivoted to the angle-iron M, and a spring $q^2$ tends to force the pawl into engagement with the rack. The tooth $q^3$ of this pawl is so shaped as to allow the carriage to move forward and when free to act holds it against a backward movement. The pawls Q and $Q^2$ are formed with tailpieces $q^4$ and $q^5$, both arranged in front of a plunger $Q^3$ free to slide toward and from the tails of the pawls in a casing $Q^4$. A spring $Q^5$ tends to move the plunger into engagement with the tails of the pawls, so as to force them inwardly to disengage their teeth from the rack-bar on the carriage.

A lever $Q^6$, pivoted to the angle-iron M, is connected with the plunger by a pin $q^6$. One end of the lever is provided with an arm $q^7$, adapted to engage with a pawl $q^8$, pivoted to the angle-iron or the extension thereof. A spring $q^9$ tends to move the pawl into engagement with the arm $q^7$. The opposite end of the lever $Q^6$ is connected with a bell-crank lever $Q^7$ free to move about its stationary pivot.

In the position shown in Fig. 30 the pawls are free to move and act to feed the carriage forward from right to left step by step; but when the carriage has reached the end of a line the tail of the pawl $q^8$ abuts against the finger $q^{10}$ and is released from engagement with the arm $q^7$ of the lever $Q^6$. The spring $Q^5$ being now free to act forces the plunger $Q^3$ forward and releases both the pawls Q and $Q^2$, and the carriage is returned to the starting-point by means of the weight P. When it reaches the starting-point, a finger $q^{11}$ on the carriage abuts against the end of the bell-crank lever $Q^7$, swings it about, causing the plunger to be withdrawn from the pawls Q and $Q^2$, and the arm $q^7$ is forced into engagement with the pawl $q^8$, and the feed and stop pawls are free to act as usual. The finger $q^{10}$ is made adjustable, as indicated, to trip the pawl $q^8$ at any desired position of the carriage to vary the length of the printed lines.

The carriage is fed forward by power derived from the rotary driver through the following connections: The arm Q' of the feed-pawl Q is secured to the vertical rod R, which has its bearings in the angle-piece M' and in a bracket R', secured to the frame of the machine. A spring $R^2$, encircling and secured to the shaft and to the bracket R', holds the feed-pawl in its normal or retracted position. The shaft R carries on its lower end a laterally-projecting arm $R^3$, which is connected by a universal joint $r$ with a rod $R^4$, pivotally connected at its front end to the lower arm of a bell-crank lever $R^5$, pivoted to the side frame of the machine. The upper arm of this bell-crank lever is pivotally connected with a vertical rod $R^6$, the upper end of which is pivotally connected with the rearward extension of the dog-carrier $D^2$, which is similar in construction and operation to the dog-carrier D'. The dog in this mechanism is adapted to engage with the teeth $b'$ of the driver. Each time that a dog-carrier of the type-carrier-actuating mechanism is operated the pawl on the carrier $D^2$ is tripped by the pivoted dog $r^2$, which is connected with and operated by the arm $n^\times$ of the rod $N^5$.

Each time that a dog-carrier in the type-carrier-actuating mechanism is operated the dog-carrier D' of the carriage-actuating mechanism is moved about its pivot and actuates the feed-pawl of the carriage to advance the carriage one step. The mechanism is so arranged that the type-carrier is actuated and brought to the proper position before the hammer is operated, the carriage being operated by the tooth in the driver immediately following the one acting upon the type-carrier-actuating mechanism to bring it into position for the printing of the next letter.

To turn the roller for a new line of printing, I secure to one end thereof a ratchet-wheel U, and on the shaft of the roller pivot an arm U', carrying a spring-pawl $u$, adapted to engage with the ratchet. The arm U' when free is held in the position indicated by dotted lines in Fig. 35 by a spring $u'$. A horizontal inclined arm $U^2$ is adjustably secured to a bracket $U^3$ on the angle-iron M, and the arm U' is adapted to engage with this arm when the carriage is returned after having been fed forward. Normally the arm U' is held in a substantially vertical position, but when it comes in contact with the inclined arm $U^2$ it is rocked about its pivot and the pawl $u$, engaging with the ratchet, turns the roller the desired amount. By adjusting the inclination of the arm $U^2$ the distance between the lines may be varied.

In order that the carriage may be fed forward without operating the other parts of the machine, I provide a spacing-key S, mounted in bearings on the flange $A^2$ and acting upon a pivoted spring-controlled dog S' on a bell-crank lever $S^2$. The lower end of the bell-crank lever $S^2$ is connected by means of a rod $S^3$ to the bell-crank lever $S^4$, to the upper arm of which is connected a rod or plunger $S^5$, adapted to disengage the pawl on the dog-carrier $D^2$. A spring $S^6$, connected to the bell-crank lever $S^4$ and to the frame A, holds the rod away from the pivoted dog $r^2$ to permit the pawl to engage with the dog on the carrier $D^2$. If the spacing-key S be depressed, the rod $S^5$ will be raised through the connections above specified, the dog $r^2$ will be raised, and the pawl disengaged from the dog on the carrier $D^2$, and the carriage-feed mechanism will be operated. This operation may be repeated a sufficient number of times to feed the carriage forward the desired amount.

If it is desired to return the carriage to its initial position before it has reached the end of a line, the operator may disengage the feed-pawl from the carriage-rack and permit the return of the carriage by depressing the key T, which is connected with a shaft T', which shaft is also connected by an arm $T^2$ with a link or rod $T^3$, pivotally connected at its rear end to an upright lever $T^4$, adapted to engage with an arm $t$ on the catch-pawl $q^8$. When the key T is depressed, the pawl $q^8$ is disengaged from the lever $Q^6$, and the spring-plunger $Q^4$ operates to effect the disengagement of both the feed and the stop pawls from the carriage, which is then returned to the starting-point by the weight P.

It will be noted that in my machine the type-carrier is normally stationary and is intermittently actuated by mechanism normally disconnected from a rotary driver, but connected therewith at the will of the operator, and that instead of being moved back and forth in opposite directions the type-carrier always moves in the same direction, being thus progressively rotated, and each time that it is moved from its normal position it is turned the desired amount to bring the proper character into printing position.

I have thus provided mechanism for performing all the operations necessary to the complete and efficient working of the machine. The several instrumentalities employed are organized to coöperate with each other, but some parts of the apparatus may be used separately and in machines differing in their details of construction from those herein shown and described.

I claim as my invention—

1. The combination of a normally stationary type-carrier, a continuously-moving cammed, ribbed or toothed driver, and type-carrier-actuating mechanism interposed between the carrier and the driver and intermittently mechanically connected therewith, substantially as set forth.

2. The combination of a type-carrier, a continuously-moving driver, intermediate mechanism between the driver and the carrier positively connected to the carrier, but normally disconnected from the driver, and mechanical devices for moving said intermediate mechanism into positive mechanical engagement with the driver.

3. In a type-writer, the combination with a cammed ribbed or toothed driver, and a normally stationary type-carrier, of intermediate mechanism for operating said type-carrier from said driver, and normally disconnected from the driver, a series of keys, and means for mechanically throwing said intermediate mechanism into mechanical operative connection with the driver by the action of said keys.

4. The combination of a normally stationary intermittently-actuated type-carrier, a continuously-moving driver, type-carrier-actuating mechanism interposed between the driver and the carrier, and means for moving the type-carrier-actuating mechanism transversely to the axis of the driver into the path thereof, to be actuated thereby, substantially as set forth.

5. The combination of a normally stationary, movable type-carrier, a continuously-moving driver, and type-carrier-actuating mechanism normally disconnected from the driver, but moved by springs at the will of the operator into the path of the driver to be actuated thereby, substantially as set forth.

6. The combination of a progressively-rotated type-carrier, a continuously-moving driver having teeth, ribs or cams on its periphery, type-carrier-actuating mechanism interposed between the driver and the carrier normally disconnected from the driver, but connected therewith at the will of the operator, substantially as set forth.

7. The combination of a normally stationary, progressively-rotated type-carrier, a continuously-moving driver, type-carrier-actuating mechanism interposed between the driver and the carrier, and provided with springs for moving it into the path of the driver, substantially as set forth.

8. The combination of a normally stationary, progressively-rotated type-carrier, a cammed, ribbed or toothed driver, and type-carrier-actuating mechanism interposed between the driver and the carrier, normally disconnected from the driver, but connected therewith at the will of the operator, substantially as set forth.

9. The combination of a normally stationary type-carrier, a continuously-moving driver, type-carrier-actuating mechanism interposed between the driver and the carrier, and mechanism for causing the type-carrier-actuating mechanism to move transversely to the axis of the driver into the path thereof to be actuated thereby, substantially as set forth.

10. The combination of a type-carrier, a rotary driver, type-carrier-actuating mechanism interposed between the carrier and the driver, and finger-keys adapted to engage, through intermediate mechanism, with the type-carrier-actuating mechanism to cause it to move transversely to the axis of the driver into the path thereof to be actuated thereby, substantially as set forth.

11. The combination of a type-carrier, a driver, dog-carriers, dogs thereon adapted to engage with the driver, the type-carrier-actuating frame with which the dog-carriers engage, and connections between this frame and the type-carrier, substantially as set forth.

12. The combination of a type-carrier, a driver, a series of dogs adapted to engage with the driver, a type-carrier-actuating frame, operated by the dogs and connections between the frame and the type-carrier, substantially as set forth.

13. The combination of a type-carrier, a rotary driver, dog-carriers, dogs thereon adapted to engage with the rotary driver, the rocking type-carrier-actuating frame with which the dog-carriers engage, pawl-and-ratchet mechanism actuated by this frame, and gearing operated thereby, and actuating the type-carrier, substantially as set forth.

14. The combination of a type-carrier, a rotary driver, dog-carriers, dogs thereon adapted to engage with the driver, the rocking type-carrier-actuating frames with which the dog-carriers engage, pawl-and-ratchet mechanism actuated by these frames, and gearing connected with the type-carrier shaft and actuated by the pawl-and-ratchet mechanism, substantially as set forth.

15. The combination of a type-carrier, a rotary driver, dog-carriers, dogs thereon adapted to engage with the driver, mechanism connecting the type-carrier with the dog-carriers, pawls on the dog-carriers for holding the dogs from engagement with the driver, and keys, with intermediate connections, for releasing the pawls from the dogs, substantially as set forth.

16. The combination of a driver, the type-carrier, normally disconnected from the driver, the finger-keys, mechanism connecting the finger-keys with the type-carrier, and means for causing the return of said mechanism to its normal position before the keys are returned, substantially as set forth.

17. The combination of a continuously-moving driver, a normally stationary type-carrier, finger-keys, mechanism for connecting the finger-keys with the type-carrier, and means for causing the return of said mechanism to its normal position before the keys are returned, substantially as set forth.

18. The combination of a continuously-moving driver, a type-carrier, a type-carrier-actuating frame having an inclined, stepped bar, connections between this frame and the type-carrier, and means for actuating the frame from the driver to move the type-carrier, substantially as set forth.

19. The combination of a type-carrier, a rotary driver, a type-carrier-actuating frame having an inclined bar, connections between the frame and the type-carrier, a series of dog-carriers, and dogs thereon adapted to engage with the rotary driver, and to move the type-carrier-actuating frame, substantially as set forth.

20. The combination of a type-carrier, a type-carrier-actuating frame having an inclined cross-bar, a pawl actuated by this frame, a ratchet with which it engages, a gear-wheel connected with the ratchet and rotated thereby, and connections between this gear-wheel and the type-carrier, substantially as set forth.

21. The combination of a normally stationary progressively-rotated type-carrier, a pinion connected therewith, a gear-wheel operatively connected with the pinion, a pawl and ratchet-wheel for operating the type-carrier through the gear and pinion, and means for actuating the pawl and ratchet-wheel, substantially as set forth.

22. The combination of a type-carrier, a pinion connected therewith, a gear-wheel operatively connected with the pinion, a ratchet-wheel on each side of the gear-wheel with teeth out of line with each other, pawls engaging with the ratchet-wheels, and mechanism for actuating the pawls, substantially as set forth.

23. The combination of a type-carrier, a pinion connected therewith, a gear-wheel, the number of whose teeth is a multiple of the teeth in the pinion, a pawl and ratchet-wheel for operating the type-carrier through the gear and pinion, and means for actuating the pawl and ratchet-wheel, substantially as set forth.

24. The combination of a type-carrier, a pinion connected therewith, a gear-wheel, the number of whose teeth is a multiple of the teeth in the pinion, a pawl and ratchet-wheel for operating the type-carrier through the gear-wheel and pinion, the number of teeth in the ratchet-wheel corresponding in number to the multiple between the teeth in the pinion and gear-wheel, substantially as set forth.

25. The combination of a rotary driver, a normally stationary, progressively-rotated type-carrier, a series of dog-carriers, dogs thereon adapted to engage with the rotary driver, pawls for holding the dogs out of engagement with the driver, finger-keys, mechanism interposed between the keys and the pawls for releasing them from engagement with the dogs, a guide-bar with which the tails of the dogs engage, a rocking frame having an inclined, stepped cross-bar with which the dog-carriers engage, pawl-and-ratchet mechanism actuated thereby, a gear-wheel, and a pinion connected with the type-carrier with which the gear-wheel engages, substantially as set forth.

26. The combination of a type-carrier, a driver, a series of dogs adapted to engage intermittently with the driver, connections between the dogs and the carrier, and stop mechanism for arresting the movement of the carrier, substantially as set forth.

27. The combination of a type-carrier, a rotary cammed, ribbed or toothed driver, type-carrier-actuating mechanism interposed between the driver and the carrier, and normally disconnected from the driver, and stop mechanism actuated by the type-carrier-actuating mechanism, substantially as set forth.

28. The combination of a rotary type-carrier, a stop-cylinder having grooves or notches arranged spirally thereon, a series of spring-actuated stop-pawls, and means for rotating the type-carrier, and for releasing the stop-pawls to engage with the stop-cylinder, substantially as set forth.

29. The combination of a type-carrier, a series of stop-pawls, and a yielding frame in which the stop-pawls are mounted, substantially as set forth.

30. The combination of a type-carrier, a stop-cylinder, a series of stop-pawls adapted to engage therewith, and a yielding frame in which the stop-pawls are mounted, substantially as set forth.

31. The combination of a rotary type-carrier, a stop-cylinder connected therewith and formed with a series of notches or grooves arranged spirally, a series of spring-controlled stop-pawls adapted to engage with the notches, and a frame in which the stop-pawls are mounted, substantially as set forth.

32. The combination of a rotary type-carrier, a rotary driver, a series of dog-carriers, dogs thereon adapted to engage with the driver, a type-carrier-actuating frame with which the dogs engage, mechanism connecting this frame with the type-carrier, a stop-cylinder, stop-pawls adapted to engage therewith, and with which the dog-carriers engage, and a frame in which the stop-pawls are mounted, substantially as set forth.

33. The combination of a progressively-rotated type-carrier, having a series of rows of type on its periphery, a power-driven device for operating the type-carrier and connections between the power-driven device and the carrier for moving the type-carrier longitudinally, relatively to its axis of rotation, substantially as set forth.

34. The combination of an intermittently-rotated type-carrier, having a series of rows of type on its periphery, a driver, actuating mechanism between the driver and the type-carrier for rotating it, and means connecting the type-carrier with the driver for moving it longitudinally, relatively to its axis, and keys normally disconnected from the type-carrier-actuating mechanism for moving said mechanism into engagement with the driver, substantially as set forth.

35. The combination of a normally stationary progressively-rotated type-carrier, a driver, type-carrier-actuating mechanism interposed between the driver and carrier, and normally disconnected from the driver, means for operatively connecting the type-carrier-actuating mechanism with the driver, and means for moving the type-carrier longitudinally, relatively to its axis, substantially as set forth.

36. The combination of a progressively-rotated type-carrier, a rotary driver, and mechanism normally disconnected from the driver but adapted to connect it with the type-carrier to move said carrier longitudinally, substantially as set forth.

37. The combination of a normally stationary, progressively-rotated type-carrier, a rotary toothed driver, a series of dog-carriers, dogs thereon adapted to engage with the driver, connections between the dog-carriers and the type-carrier for rotating it, and means for moving the type-carrier longitudinally, relatively to its axis, substantially as set forth.

38. The combination of a type-carrier, a segmental notched plate, an arm carrying a pawl engaging the notches in the plate, and operatively connected with the type-carrier, keys for oscillating the segmental plate, and shifting keys for moving the pawl into different notches on the plate, substantially as set forth.

39. The combination of a type-carrier, a shifter for moving it longitudinally, a segmental notched plate, an arm carrying a pawl adapted to engage said notches, a key, and mechanism connecting the key with the arm, whereby, when the key is depressed, the pawl is moved into a notch in the plate, substantially as set forth.

40. The combination of the longitudinally-movable type-carrier, a type-carrier shifter, a pawl operatively connected to and moving with said shifter, a segmental notched plate with one of the notches of which the pawl engages when the carrier is moved into a given position, and means for moving the plate to act upon the pawl to move the carrier into another given position, substantially as set forth.

41. The combination of a type-carrier, a shifter for moving the carrier longitudinally, an oscillating plate, an arm operatively connected with said plate, means for changing the relation between the arm and the plate, thereby controlling the amount of motion given to the type-carrier, and means for oscillating the plate to produce a longitudinal motion of the type-carrier corresponding to the motion of the plate, but less in degree, substantially as set forth.

42. The combination of a longitudinally-movable type-carrier, having a series of rows of type, a segmental notched plate having an oscillating movement corresponding to the distance between two rows of characters on the type-carrier, an arm operatively connected with the type-carrier and carrying a pawl engaging the plate, a shifting key for moving the pawl from one notch to another, the arrangement being such that the distance between the notches in the plate corresponds to twice the distance between two rows of characters on the type-carrier, substantially as set forth.

43. The combination of a longitudinally-movable type-carrier, a type-carrier shifter, a pawl connected to and moving with said shifter, an oscillating notched plate, means for moving the shifter to move the carrier into a given position and the pawl into a given notch in said plate, and means for moving the plate which acts on the pawl to move the carrier into another given position, substantially as set forth.

44. The combination of a longitudinally-movable type-carrier having a series of rows of type, a shifter for moving it longitudinally, a notched oscillating plate adapted to be oscillated a distance equal to the distance between two rows of characters on the type-carrier, and thereby cause the longitudinal movement of the carrier a distance equal to the distance between two rows of type, a pawl for engaging either of the notches in said plate, mechanism operated by a key-lever for determining which notch the pawl shall engage, and means for oscillating the plate to move the carrier, substantially as set forth.

45. The combination of a longitudinally-movable type-carrier, a type-carrier shifter for moving it longitudinally, a key and mechanism connecting it with the shifter, whereby the carrier is moved into a given position on the depression of said key, a notched oscillating plate connected with the shifter, a pawl or dog moved by the mechanism interposed between said key and shifter to engage one of the notches in said plate, a series of keys for effecting impressions from one row of type when the carrier is in the position determined by the depression of said first-named key, and a second series of keys, and mechanism interposed between said keys and the notched plate and printing devices, whereby, on the depression of one of said last-mentioned keys, the plate is first caused to move and, acting on the pawl, advance the carrier another row of type and the printing devices then act to take an impression from said last row of type, substantially as set forth.

46. The combination of a type-carrier, its shaft, a cam operatively connected with the shaft, a shaft on which the cam is mounted, a continuously-moving driver, and connections between the cam-shaft and the rotary driver for moving it to effect the longitudinal movement of the type-carrier, substantially as set forth.

47. The combination of a type-carrier, the shaft on which it is mounted, a rotary driver, a dog-carrier, a dog thereon adapted to engage with the driver, a key in the keyboard, mechanism operated by this key to cause the dog to move into the path of the driver, a cam operatively connected with the type-carrier shaft, and connections between the cam and the dog-carrier whereby, when the dog-carrier is actuated, the type-carrier is moved longitudinally, substantially as set forth.

48. The combination of a type-carrier, a cam operatively connected therewith, a dog-carrier operatively connected with the cam, a dog on the dog-carrier, a rotary driver with which it is adapted to engage, a pawl normally holding the dog out of the path of the driver, an actuating-key in the keyboard, an oscillating frame with which it engages, a pawl-tripping rod, and connections between this rod and the oscillating frame, substantially as set forth.

49. The combination of a type-carrier, its shaft, a cam with which this shaft is operatively connected, a shaft upon which the cam is mounted, a toothed wheel or pinion thereon, a segmental lever engaging therewith, a shifting key, connections between the shifting key and the segmental lever, an arm secured to the cam-shaft, and connections between this arm and the pinion, substantially as set forth.

50. The combination of a type-carrier, its shaft, a cam with which the shaft is operatively connected, the cam-shaft, a pinion loosely mounted thereon, a pawl-carrying arm secured to the cam-shaft, a notched plate with which the pawl on the arm engages, means for connecting the pinion with the pawl-carrying arm, means for turning the pinion on its shaft, and means for moving the notched plate independently of the pinion, substantially as set forth.

51. The combination of a type-carrier, its shaft, a cam operatively connected with said shaft, a shaft to which the cam is secured, a pawl-carrying arm secured to this shaft, a notched plate with which the pawl engages, a lever pivoted to the arm and engaging with the pawl, a pinion on the cam-shaft, connections between the pinion and the pawl-carrying arm, and means for turning the pinion about its axis, substantially as set forth.

52. The combination of a type-carrier, its shaft, a cam operatively connected therewith, a shaft to which it is secured, a pinion carried by this shaft, a segmental lever engaging therewith, an arm secured to the cam-shaft and adapted to be moved by the pinion, a shifting key operatively connected with the segmental lever, a dog-carrier, means for connecting it with the arm secured to the cam-shaft, a rotary driver, a dog on the dog-carrier adapted to engage with the driver, a pawl for holding the dog out of engagement with the driver, a finger-key, an oscillating frame with which said key engages, and connections between this frame and the pawl, substantially as set forth.

53. The combination of the type-carrier, the shaft on which it is mounted, the longitudinally-slotted stop-cylinder revolving with the shaft, the arms on the type-carrier shaft sliding in said slots, and means for moving the type-carrier shaft longitudinally through the stop-cylinder, substantially as set forth.

54. The combination of a type-carrier, a driver, a series of dogs normally disconnected from the driver but adapted to be connected therewith at the will of the operator, connections between the dogs and the type-carrier for actuating it, a hammer and hammer-operating mechanism actuated by the driver, substantially as set forth.

55. The combination of a type-carrier, a hammer, a driver, hammer-actuating mechanism interposed between the driver and the hammer, type-carrier-actuating mechanism, and devices operated by the type-carrier-actuating mechanism, for causing the hammer-actuating mechanism to move into the path of the driver.

56. The combination, in a type-writing machine, of a hammer, a continuously-rotating cammed driver, and hammer-actuating mechanism normally disconnected from the driver, but automatically moved into the path thereof, substantially as set forth.

57. The combination of a type-carrier, a driver, a series of type-carrier-actuating dogs, a hammer-actuating dog, a carriage-actuating dog, a key for throwing the type-carrier-actuating dog into operation, and devices operated by the type-carrier-actuating dog to bring the hammer and feed dogs into operation.

58. In a type-writer, the combination with a cammed ribbed or toothed driver, of a normally stationary type-carrier, a locking mechanism for the latter, an impression-hammer, and intermediate mechanism for operating said type-carrier, locking mechanism and impression-hammer from said driver.

59. In a type-writer, the combination with a cammed ribbed or toothed driver, of a normally stationary type-carrier, a locking mechanism for said type-carrier, intermediate mechanism for operating said type-carrier, and locking mechanism from said cammed ribbed or toothed driver, a series of keys, and means for throwing said intermediate mechanism into operative connection with said driver by the action of said keys.

60. In a type-writer, the combination with a cammed ribbed or toothed driver, of a normally stationary type-carrier, a locking mechanism, an impression-hammer, intermediate mechanism for operating said impression-hammer, type-carrier and locking mechanism from said cammed ribbed or toothed driver, a series of keys, and means for throwing said intermediate mechanism into operation by the action of said keys.

61. In a type-writer, the combination with a cammed ribbed or toothed driver, of a movable type-carrier, an impression-hammer, intermediate mechanism for operating said type-carrier and hammer from said driver, a series of keys, a series of impulse or tripping levers, and means for throwing said intermediate mechanism into operation by the action of said keys and levers.

62. The combination of a type-carrier, a rotary driver, dog-carriers, dogs thereon adapted to engage with the driver, a type-carrier-actuating frame with which the dog-carriers engage, connections between this frame and the type-carrier, a hammer, a dog-carrier connected therewith, a dog carried by said dog-carrier and adapted to engage with the rotary driver, a pawl for holding the dog out of the path of the driver, and mechanism operated by the dog-carriers of the type-carrier-actuating mechanism for tripping the pawl which holds the dog of the hammer mechanism, substantially as set forth.

63. The combination of a type-carrier, dog-carriers, dogs thereon, a rotary toothed driver with which these dogs engage, a type-carrier-actuating frame connected with the type-carrier, a hammer, a dog-carrier connected therewith, and a dog mounted on this carrier adapted to engage with teeth on the rotary driver, substantially as set forth.

64. The combination of a type-carrier, dog-carriers, dogs thereon, a rotary toothed driver with which these dogs engage, a type-carrier-actuating frame connected with the type-carrier, a hammer, a dog-carrier connected therewith, and a dog mounted on this carrier adapted to engage with teeth on the rotary driver out of line with those which engage the dogs of the type-carrier-actuating mechanism, substantially as set forth.

65. The combination of a type-carrier, a driver, type-carrier-actuating mechanism interposed between the driver and the type-carrier, a hammer, mechanism connecting the hammer with the driver, a frame carrying a series of pawls adapted to engage with the type-carrier-actuating mechanism, and connections between this frame and the hammer-actuating mechanism, whereby the hammer-actuating mechanism is caused to engage with the driver each time that the type-carrier-actuating mechanism is operated, substantially as set forth.

66. The combination of a type-carrier, a series of dog-carriers, a type-carrier-actuating frame, connections between said frame and the type-carrier, connections between the dog-carriers and the driver, a hammer, a dog-carrier connected therewith, a dog thereon adapted to engage with the driver, a pawl for holding this dog out of engagement with the driver, a series of pawls adapted to engage with the dog-carriers of the carrier-actuating mechanism, a lever for tripping the pawl of the hammer-actuating mechanism, and connections between this lever and the pawl-carrying frame which engage with the dog-carriers of the carrier-actuating mechanism, substantially as set forth.

67. The combination of a type-carrier, a series of stop-pawls, a ratchet-wheel connected with the carrier, and a yielding locking-pawl adapted to engage with the ratchet, substantially as set forth.

68. The combination of a roller, a series of pivoted fingers adapted to press the paper against the roller, independently, and means for withdrawing the fingers from the roller simultaneously, substantially as set forth.

69. The combination of a roller, a series of spring-actuated fingers adapted to press the paper against the roller, a shaft on which the fingers are independently mounted, and connections between the shaft and the fingers, whereby they may all be withdrawn from the roller simultaneously, substantially as set forth.

70. The combination of a carriage, a rotary driver, a dog-carrier, a dog thereon adapted to engage with the driver, connections between the dog-carrier and the carriage for feeding it forward, a pawl for normally holding the dog on the dog-carrier out of the path of the rotary driver, and means for releasing this pawl, substantially as set forth.

71. The combination of a carriage, a rotary driver, a dog-carrier, a dog thereon adapted to engage with the driver, connections between the dog-carrier and the carriage for feeding it forward, a pawl for normally holding the dog on the dog-carrier out of the path of the rotary driver, a spacing-key, and connections between this key and the pawl, substantially as set forth.

72. The combination of a type-carrier, a rotary driver, a series of dog-carriers, dogs thereon adapted to engage with the driver, a type-carrier-actuating frame with which the dog-carriers engage, connections between this frame and the type-carrier, carriage-actuating mechanism connecting the carriage with a dog-carrier, a dog on this carrier adapted to engage with the rotary driver, a pawl for normally holding the dog withdrawn from the driver, a frame carrying pawls adapted to engage with the dog-carriers of the type-carrier-actuating mechanism, and connections between this frame and the pawl that engage with the dog on the carriage-actuating mechanism, substantially as set forth.

73. The combination of a carriage, a continuously-moving driver, carriage-actuating mechanism interposed between the driver and the carriage and normally disconnected from the driver, and means for automatically returning the carriage to its initial position after a line has been printed, substantially as set forth.

74. The combination of a carriage, a continuously-moving driver, a feed-pawl operatively connected with and actuated by the driver, and engaging with the carriage, a stop-pawl, and means for automatically withdrawing both pawls from engagement with the carriage, substantially as set forth.

75. The combination of a carriage, a feed-pawl engaging therewith, a dog-carrier, connections between the dog-carrier and the feed-pawl, a rotary driver adapted to engage with the dog on the dog-carrier, a pawl engaging with this dog, means for releasing it, a stop-pawl engaging with the carriage, and means for withdrawing both the feed and stop pawls from engagement with the carriage, substantially as set forth.

76. The combination of a carriage, feed and stop pawls engaging therewith, springs for holding the pawls in engagement with the carriage and devices actuated by a spring stronger than the pawl-springs, engaging the tails of the pawls to withdraw them both simultaneously from the carriage, substantially as set forth.

77. The combination of a carriage, a feed-pawl, the rocking arm on which it is mounted, means for operating this arm, a stop-pawl, a spring-actuated rod or plunger adapted to engage with the feed and stop pawls, a lever connected with the plunger, a pawl engaging the lever to hold the plunger away from the pawls, means for disengaging the pawl from the lever, and means for automatically causing the engagement of the pawl with the lever, substantially as set forth.

78. The combination of the carriage, the feed and stop pawls engaging therewith, a spring-actuated plunger adapted to engage with the tails of the pawls, a lever connected with the plunger, a pawl engaging therewith to hold it away from the tails of the pawls, an adjustable finger carried by the carriage, and adapted to engage with said pawl, a bell-crank lever connected with the lever to which the plunger is connected, and an arm or finger on the carriage adapted to engage with the bell-crank lever, substantially as set forth.

79. In a type-writing machine, a frame formed in one piece with front and rear downwardly-projecting flanges, and with front and rear upwardly-projecting flanges, an elevation between the front and rear ends, a flange in rear of this elevation, and uprights or supports on the bed-plate, substantially as set forth.

80. The combination of the bed-plate, the uprights or supports thereon, the rotary driver mounted in said supports, an upwardly-projecting flange in rear of the supports, overhanging brackets secured to said flange, a type-carrier, and type-carrier-actuating mechanism mounted on the bed-plate and between the overhanging brackets, substantially as set forth.

81. The combination of a series of key-levers, and a series of actuating-levers E', each of which is operatively connected with two of the key-levers, substantially as set forth.

82. The combination of a series of key-levers, a series of levers E', pivoted dogs engaging with the key-levers, and connections between these dogs and the levers E', substantially as set forth.

83. The combination of a series of key-levers of different lengths and mounted on a common rod, springs connected with the rear ends of these levers, adjusting devices for varying the tension of the springs, and the cushioned guide-pieces through which the key-levers extend, substantially as set forth.

84. In a type-writing machine, the combination, substantially as hereinbefore set forth, of an actuating key or lever, a tripping-lever, and a dog interposed between the actuating-key and tripping-lever, and pivotally connected with one of them.

85. In a type-writing machine, the combination, substantially as hereinbefore set forth, of an actuating key or lever, a tripping-lever, a dog interposed between the actuating-key and the tripping-lever, and carried bodily by and pivotally connected with one of them.

86. In a type-writing machine, the combination, substantially as hereinbefore set forth, of an actuating key or lever, a spur or lug thereon, a tripping-lever, a dog interposed between the actuating-key and the tripping-lever, and pivoted to the tripping-lever, and normally engaging at its opposite end with the lug on the actuating-lever, whereby, in operation, the free end of the dog has both a direct movement in the same direction and plane as the lug on the actuating-lever, and a lateral movement in the same plane, but in a different direction so that the dog and lug may be disengaged.

87. In a type-writing machine, the combination, substantially as set forth, of the key or lever, the dog which it engages, the pivoted tripping-lever upon which the dog is pivoted, a lever E' acted upon by the tripping-lever, the plunger E, the pawl $d^7$, the dog $D^4$ and the driver.

In testimony whereof I have hereunto subscribed my name.

OLUF TYBERG.

Witnesses:
  EDWARD C. DAVIDSON,
  LLOYD B. WIGHT.